(12) United States Patent
Allemann et al.

(10) Patent No.: US 8,265,985 B2
(45) Date of Patent: *Sep. 11, 2012

(54) AUTOMATED SYSTEM AND METHOD FOR MANAGING GOALS

(75) Inventors: Andrew W. Allemann, Austin, TX (US);
Shad W. Reynolds, Austin, TX (US);
Adam R. Hunter, Austin, TX (US);
Justin B. Petro, Austin, TX (US)

(73) Assignee: Versata Development Group, Inc., Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/968,986

(22) Filed: Dec. 15, 2010

(65) Prior Publication Data

US 2011/0088001 A1 Apr. 14, 2011

Related U.S. Application Data (63) Continuation of application No. 09/895,458, filed on Jun. 29, 2001, now Pat. No. 7,870,013.

(51) Int. Cl.
*G06F 17/50* (2006.01)
(52) U.S. Cl. ..................................... 705/7.36
(58) Field of Classification Search .................. 705/7.36
See application file for complete search history.

(56) References Cited

U.S. PATENT DOCUMENTS

| | | | |
|---|---|---|---|
| 5,819,263 | A | 10/1998 | Bromley et al. |
| 6,330,572 | B1 | 12/2001 | Sitka |
| 6,859,927 | B2 | 2/2005 | Moody et al. |
| 2002/0035500 | A1 | 3/2002 | Yoko et al. |
| 2002/0173999 | A1 | 11/2002 | Griffor et al. |
| 2002/0194046 | A1 | 12/2002 | Sullivan et al. |
| 2003/0229529 | A1 | 12/2003 | Mui et al. |
| 2004/0186762 | A1 | 9/2004 | Beaven et al. |

OTHER PUBLICATIONS

U.S. Appl. No. 60/133,152.
Mottl, Judith N., "Appraisal Software Ends HR Paper Chase." Information Week, p. 218, Nov. 6, 2000.
Dutton, Gail. "Making Reviews More Efficient and Fair." Workforce, vol. 80, No. 4, p. 76, Apr. 2001.
Elliott, Paul. "Power-Charging People's Performance." Training & Development, vol. 50, No. 12, p. 46(4), Dec. 1996.
Meyer, eWorkbench Real-time Tracking of Synchronized Goals, HR Magazine, Apr. 2001 [Google].
Avantos, ManagePro for Macintosh® and Windows™, Reference Manual, version 2.0, Avantos Performance Systems, Inc. Copyright © 1993.

(Continued)

*Primary Examiner* — Susanna M Meinecke Diaz
(74) *Attorney, Agent, or Firm* — Hamilton & Terrile, LLP; Kent B. Chambers (57) ABSTRACT

A goal management system stores at least first and second goals. The goal management system also stores a relationship between the first goal and the second goal. In one aspect, the goal management system detects modification of the first goal and, in response, causes the second goal to be automatically highlighted for alignment verification. In another aspect, the second goal is a parent goal to the first goal, and the relationship is stored as a parent link associating the first goal with the parent goal. The goal management system also stores an owner for the first goal. In response to detecting modification of the parent goal, the goal management system causes the first goal to be automatically highlighted for alignment verification in a display associated with the owner of the first goal, based on the parent link. Additional aspects relate to additional technological solutions which facilitate goal management through, for example, goal alignment.

42 Claims, 7 Drawing Sheets

OTHER PUBLICATIONS

Lowry et al.; Organisational Characteristics, Cultural Qualities and Excellence in Leading Australian-Owned Information Technology Firms; Information Systems Conference of New Zealand Proceedings; Oct. 30-31, 1996; pp. 72-84.

Boardman et al.; Integrated process improvement in design and manufacture using a systems approach; IEE Proceedings—Control Theory and Applications; vol. 143, Issue 2; Mar. 1996; pp. 171-185.

Jurison; Software project management: the manager's view; Communications of the AIS; vol. 2, Art. 17, Nov. 1999.

Begeman et al.; Session I—Supporting Face-To-Face Groups: Project Nick: Meetings Augmentation and Analysis; Proceedings of the ACM conference on computer-supported cooperative work; Dec. 1986.

Payne et al.; Demonstrations: Persuasive Agents and Architectures: Agent-Based Support for Human!Agent Teams; CHI '00 extended abstracts on human factors in computing systems; Apr. 2000, pp. 22-23.

Chmura et al.; Tools to Align Goals and Information Systems; IEEE Software; vol. 12, Is. 3; May 1995; pp. 108-109.

Oinas; Defining Goal-Driven Fault Management Metrics in a Real World Environment: A Case-Study From Nokia; Proceedings of the Fourth European Software Maintenance and Reengineering; Feb. 29-Mar. 3, 2000; pp. I01-I07.

Lassenius et al.; The Interactive Goal Panel: A Methodology for Aligning R&D Activities With Corporate Strategy; International Conference on Engineering and Technology Management Proceedings; Oct. 11-13, 1998; pp. 142-147.

Electronic Brouchure entitled "A Quantitative Leadership Tool for Performance Management" obtained from R "Performance eWorl<bench" (TM) hyperlink on webpage at <htfp://www.performaworks.comlperformaworkslsolutionlproducts.htmi>.

Webpage for Performaworks—Performaworks Solution—Products at <http://www.performaworks.comlperformaworkslsolutionlproducts.htmi>.

Non-Final OA mailed on Jun. 10, 2005 in parent U.S. Appl. No. 09/895,458.

Response to Non-Final OA filed in parent U.S. Appl. No. 09/895,458 on Dec. 12, 2005.

Restriction Requirement mailed on Feb. 28, 2006 in parent U.S. Appl. No. 09/895,458.

Response to Restriction Requirement filed in parent U.S. Appl. No. 09/895,458 on Mar. 9, 2006.

Non-Final OA mailed on Jun. 7, 2006 in parent U.S. Appl. No. 09/895,458.

Response to Non-Final OA filed in parent U.S. Appl. No. 09/895,458 on Nov. 7, 2006.

Final OA mailed on Jan. 29, 2007 in parent U.S. Appl. No. 09/895,458.

RCE filed with RCE submission in parent U.S. Appl. No. 09/895,458 on Jul. 30, 2007.

Non-Final OA mailed on Sep. 21, 2007 in parent U.S. Appl. No. 09/895,458.

Response to Non-Final OA filed in parent U.S. Appl. No. 09/895,458 on Mar. 21, 2008.

Non-Final OA mailed on Jul. 8, 2008 in parent U.S. Appl. No. 09/895,458.

Response to Non-Final OA filed in parent U.S. Appl. No. 09/895,458 on Nov. 10, 2008.

Final OA mailed on Dec. 26, 2008 in parent U.S. Appl. No. 09/895,458.

Response to Final OA filed in parent U.S. Appl. No. 09/895,458 on May 26, 2009.

Advisory Action mailed on Jun. 17, 2009 in parent U.S. Appl. No. 09/895,458.

RCE filed with RCE submission in parent U.S. Appl. No. 09/895,458 on Jun. 26, 2009.

Non-Final OA mailed on Aug. 14, 2009 in parent U.S. Appl. No. 09/895,458.

Response to Non-Final OA filed in parent U.S. Appl. No. 09/895,458 on Jan. 14, 2010.

Final OA mailed on Feb. 1, 2010 in parent U.S. Appl. No. 09/895,458.

Response to Final OA filed in parent U.S. Appl. No. 09/895,458 on Jul. 1, 2010.

Advisory Action mailed on Jul. 9, 2010 in parent U.S. Appl. No. 09/895,458.

RCE filed with RCE submission in parent U.S. Appl. No. 09/895,458 on Aug. 2, 2010.

Notice of Allowance mailed on Sep. 3, 2010 in parent U.S. Appl. No. 09/895,458.

FIG. 6 my goals

Step 1 - Goal Alignment  212

All of your team related goals must specify which team goal they are related to. This helps to ensure that all people within an organization are working towards the same goals.

☐ This goal does not align at this time (editable later)
200

[Goal Owner Profile]
Name: Aman Shah
Manager: My Manager

Choose Goal Category:
◉ Develop All-Star Teams
◉ Make It Work
◉ Take The Hills
◉ Build Killer Apps
214    216

Which category should I pick?

<< Back    Next >>
Step 1 of 3

210

☐☐☐☐☐ my goals
- All My Goals
- All-Star Teams Goals
- Killer Apps Goals
- Take The Hills Goals
- Make It Work Goals

- Show Printable list ?
- Add a Goal ?
  - Your Profile
  - Choose Template
  - Goal Information
  - Goal Activities
  > Goal Alignment
- View my Direct Reports ?

Visuals:
[Percent Complete ▼]

Waiting

*FIG. 8* my goals

Step 1 - Goal Alignment

All of your team related goals must specify which team goal they are related to. This helps to ensure that all people within an organization are working towards the same goals.
~200
☑ This goal does not align at this time (editable later)

[Goal Owner Profile]
Name:
Aman Shah
Manager:
My Manager

Choose Goal Category:     Which category should I pick?

◉ Develop All-Star Teams
○ Make It Work
○ Take The Hills
○ Build Killer Apps

Parent Team: [Super Team ▼]
~222
~224

Choose Team Goal

The selected team has no goals defined under the category "Develop All-Star Teams". As a result, this goal is currently marked as 'Not Aligned'. To align this goal, you have 3 choices currently:

1. Choose a different category for this goal.
2. Choose another team from the drop down box.
3. Leave this goal unaligned and go on with the goal creation process.

220

--- my goals
- All My Goals
- All-Star Teams Goals
- Killer Apps Goals
- Take The Hills Goals
- Make It Work Goals

- Show Printable list ?
- Add a Goal ?
  - Your Profile
  - Choose Template
  - Goal Information
  - Goal Activities
  - > Goal Alignment
- View my Direct Reports ?

Visuals:
[Percent Complete ▼]
    Waiting

FIG. 9

AUTOMATED SYSTEM AND METHOD FOR MANAGING GOALS

This application is a continuation of Ser. No. application No. 09/895,458, filed Jun. 29, 2001 now U.S pat. No. 7,870, 013, which is incorporated herein by reference in its entirety.

TECHNICAL FIELD OF THE INVENTION

This invention relates in general to the field of data processing. More specifically, this invention relates to an automated system and method for establishing and maintaining teams and goals within an organization.

BACKGROUND OF THE INVENTION

A typical large business organization includes numerous teams of people, with one or more specific tasks assigned to each of the teams. Traditionally a business tends to define it's teams in terms of the business' chain of command (i.e. the reporting chain). For example, a typical business sales division has a number of sales teams, each led by a manager who reports to a vice president of sales. In this type of chain-of-command structure, members of a sales team are "direct reports" of their manager. Other members of the organization typically must coordinate activities with a sales team member through that member's reporting structure.

Company's generally identify certain strategic and tactical goals, which they believe will lead the company to success. Managers typically establish goals for their reporting units, and employees of companies are also often encouraged to establish personal goals.

Business leaders have come to recognize a number of advantages associated with adopting more flexible strategies for organizing teams and setting goals to supplement the rigid, hierarchical reporting structures traditionally found in large organizations. For example, rather than requiring all team members to have the same supervisor, a more flexible strategy allows at least some teams to include members from different levels of a reporting chain and/or from different reporting chains. Teams with members from different reporting chains are considered cross-functional teams. For instance, a sales manager may be assigned to a product development team charged with creating a salable product. Such a cross-functional team increases the likelihood that a developed product will be commercially viable.

Similarly, another flexible strategy for organizing teams and setting goals allows team leaders to set team goals, without utilizing the conventional reporting chain as the sole factor in determining who may be chosen as team leaders. Furthermore, adoption of flexible and dynamic strategies for creating, modifying, and removing teams and goals facilitates more rapid and effective adaptation to changes in the business environment for the organization as a whole, provided that those strategies are well implemented.

A disadvantage associated with flexible and dynamic strategies for managing teams and goals, however, is that such strategies typically result in team and goal structures with increased complexity, compared to traditional chain-of-command strategies for managing teams and goals. For example, effective personal goals align with team goals and organization-wide goals. In a flexible and dynamic environment, however, organization-wide, team, and personal goals are rarely static, as company objectives, products, personnel responsibilities, and personnel team memberships may frequently change in response to changing conditions in a realistic business environment.

Flexible and dynamic strategies for managing teams and goals are therefore typically much more difficult to implement. Although conventional management information systems (MISs) may provide basic functionality for storing static goals, conventional MISs generally lack facilities for overcoming the difficulties associated with flexible and dynamic strategies for managing teams and goals.

SUMMARY OF THE INVENTION

The present invention relates to a system and a method for managing goals. In one embodiment of the present invention, a goal management system stores at least first and second goals. The goal management system also stores a relationship between the first goal and the second goal. In response to detecting modification of the first goal, the goal management system causes the second goal to be automatically highlighted for alignment verification.

In another embodiment, the second goal is a parent goal to the first goal, and the relationship is stored as a parent link associating the first goal with the parent goal. The goal management system also stores an owner for the first goal. In response to detecting modification of the parent goal, the goal management system causes the first goal to be automatically highlighted for alignment verification in a display associated with the owner of the first goal, based on the parent link.

In one embodiment, goals managed in accordance with embodiments of the invention can be displayed using a computer system to visually verify and manipulate alignment in accordance with information and rules provided by a goal management system.

The above summarized embodiments thus facilitate managing goals through, for example, goal alignment. Additional embodiments provide other technological solutions which facilitate goal alignment.

BRIEF DESCRIPTION OF THE DRAWINGS

A more complete understanding of the invention and its objectives and advantages may be acquired by referring to the following description and the accompanying drawings, wherein:

FIGS. 8 and 9 depict user interface screens from an example wizard that facilitates goal alignment.

DETAILED DESCRIPTION

Overview

The difficulties associated with supporting flexible strategies for team and goal management include challenges relating to keeping people advised of changes to goals and teams, obtaining feedback on new goals and goal modifications, and ensuring that goals are organized in a logical and useful way.

For instance, the leader or owner of a team may change the goals and personnel of that team, such as in response to altered business requirements. These two changes have downstream cascading effects that can alter numerous aspects of team and goal management, such as goal alignment, goal organization, and maintenance of a comprehensive goal list.

Also, a team member may decide that a new team should be created to assist with one or more team goals. In a dynamic environment, such initiatives are generally encouraged. However, if teams are created without regard to the organization's chain-of-command, there is greater risk that some teams will have inconsistent or redundant goals.

Moreover, in a dynamic environment, each individual may be associated with numerous teams. Belonging to many teams generally makes it difficult for an individual to reconcile all of the different personal responsibilities associated with those teams and to keep abreast of all pertinent goal changes. In addition, when a team leader may not be the supervisor of the team members, it can be more difficult for the team members to obtain feedback on their goals from people in appropriate positions to evaluate those goals with regard to the organization's other goals.

Consequently, organizations with flexible team and goal management strategies generally have an increased need for systems and methods which effectively organize teams and goals and the need for systems and methods which provide clear explanations of team and goal relationships. Therefore, a need has arisen for methods and systems for managing teams and goals in organizations with flexible team and goal environments. A further need exists for methods and systems which keep people advised of changes relating to goals and teams. A further need exists for methods and systems which assist in obtaining feedback on new goals and goal modifications. A further need exists for methods and systems which keep goals organized consistently with respect to corresponding teams. A further need exists for methods and systems which keep goals organized consistently with respect to goal type and team affiliation.

As recognized by embodiments of the present invention, among the technologies useful in a goal management system for a dynamic environment is a technology for aligning goals. In general, a secondary goal is considered to be "aligned" or "in alignment" with a primary goal if the secondary goal assists in the realization of the primary goal. For example, with reference to FIG. 3, the secondary goal of implementing all required features in software Product Z is aligned with the primary goal of producing software that meets all specs. In an example embodiment of the present invention, goal alignment technologies are implemented as parts of a goal management system that operate on a computer or network of computers.

An embodiment of the present invention makes it easier for an individual to keep his or her goal aligned with other goals, such as parent goals. The embodiment accomplishes that objective by automatically advising the individual of changes to the other goals by effecting changes to a user interface in a client data processing system. Consequently, individuals who create goals with links to other goals need not constantly monitor the other goals to determine whether any changes have been made.

In another embodiment, a goal owner need not manually request feedback from his or her supervisor every time the goal owner creates or changes a goal. Instead, the embodiment automatically highlights the new or modified goal for review by the supervisor.

Another embodiment helps team leaders avoid creating inconsistent or duplicative goals by enforcing rules which require certain relationships between the organization's goals and its teams.

Example Embodiments

Figure 4:
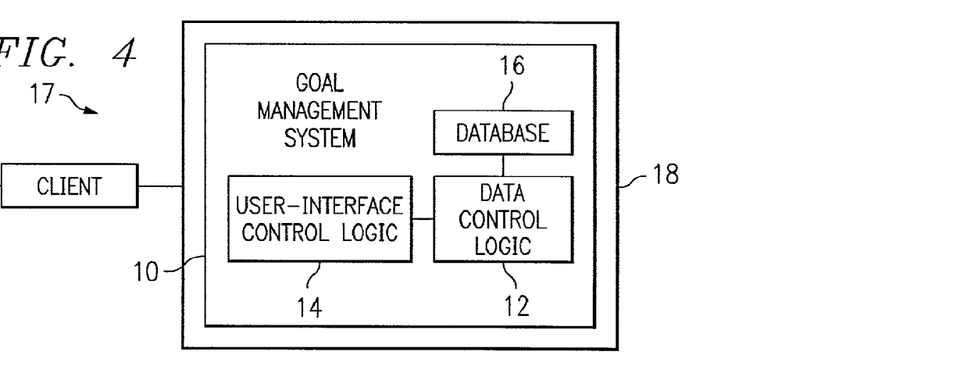
FIG. 4 is a block diagram of the logical components of the example goal management system.

Referring now to FIG. 4, goal management system 10 is an example of a system that provides the technological ability to maintain alignment of goals from the personal level to the highest company strategic initiative. Goal management system 10 has application to a wide range of industries and other organizations where goals and alignment of goals can be important. Example beneficiary industries include: computer hardware and software, professional services, financial services, automotive, telecommunications, medical and pharmaceutical, and construction.

Goal management system 10 uses two basic team types: static teams and dynamic teams. The static teams depict the reporting chain of an organization and correspond, for example, to the management structure recorded in the organization's human resources (HR) database. Specifically, FIG. 1 includes a left column that lists Acme's static teams and a right column that lists Acme's dynamic teams, where Acme is an example organization. The static teams correspond to the Acme reporting chain.

Figure 1:
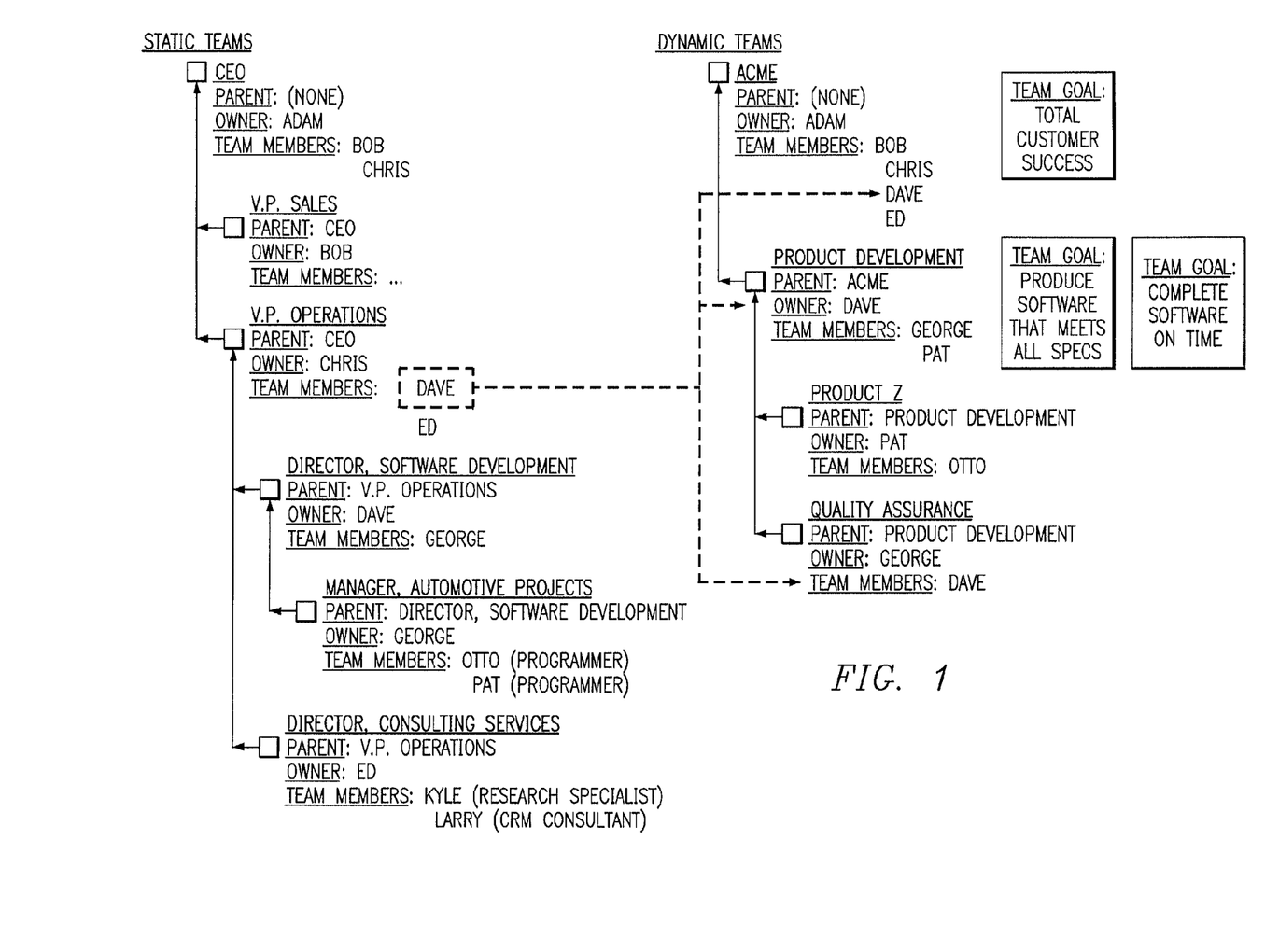
FIG. 1 is a table with two columns respectively depicting a static chain of teams and a dynamic chain of teams, with arrows highlighting some differences between the static and dynamic chains.

To ensure that the stored static teams are organized according to the reporting chain, goal management system 10 implements the following rules for managing static teams:

1. every static team has one owner and zero or more team members,
2. the owner of a static team is the person who represents the team in the HR database,
3. the owner of the static team at the top of the reporting chain is the overall leader of the organization (e.g., the CEO),
4. every person, except the overall leader, is a team member of exactly one static team, and
5. the team members of a static team are the people who report directly to the owner of that team.

Consequently, the CEO, for example, is not one of the team members of any static team, but everyone else is one of the team members of one static team. Also, for each static team, the team members are referred to as the "direct reports" of the owner. Accordingly, the data construct(s) and associated content which are used to record the relationships between an owner of a static team and the team members of that team are known as reporting links.

At the top of the chain shown in FIG. 1 is a team named "CEO." Team "CEO" includes an owner, Adam, who is the chief executive officer of Acme, and two team members, Bob and Chris, who report directly to Adam according to the organization's reporting chain and/or HR system. Since Team "CEO" is at the top of the chain, it has no parent team.

Team "CEO" is the parent team of teams "V.P. Sales" and "V.P. Operations." Also, Bob, who is the V.P. of Sales for Acme, and Chris, who is the V.P. of Operations, are the owners of Teams "V.P. Sales" and "V.P. Operations," respectively. Among the members of Team "V.P. Operations" is Dave, who is the Director of Software Development, as indicated in Team "Director, Software Development." Similarly, Team "Manager, Automotive Projects" and Team "Consulting Services" identify supervisors and respective direct reports.

In contrast to the static teams, the dynamic teams are not restricted to the structure of the reporting chain. For example, as indicated by the dashed arrows in FIG. 1, Dave is owner of Team "Product Development" and George is a member, but George is the owner of Team "Quality Assurance" and Dave is a member.

In any particular implementation, parent teams may be directly or indirectly associated with subordinate teams. In the example embodiment, data records are used to store the team definitions, and those data records include parent-team fields that store identifiers for the parent teams. In alternative embodiments, the parent teams are identified indirectly. For example, parent teams may be identified by cross referencing the team owner with the lists of team members from other teams. In any case, the data construct(s) and associated content which are used to record the relationships between teams and parent teams are known as a parent links. In the example embodiment, all of the static teams except for the top team are connected to the reporting chain via respective parent links.

The example embodiment also imposes rules regarding the relationships between dynamic teams and regarding membership in dynamic teams to help ensure that teams and goals are aligned. For example, among the restrictions imposed by the data control logic 12 (FIG. 4) in goal management system 10 are the following:
1. every dynamic team has one owner and zero or more other members,
2. the owner of a dynamic team is the person who created the team, and
3. the other members of a dynamic team are the people expected to work with the owner toward achieving one or more goals associated with the dynamic team.

It will be recognized by those of ordinary skill in the art that other restrictions or rules could be used to govern relationships in alternative embodiments. Also, with regard to both static and dynamic teams, it should be noted that the terms "owner" and "team member" describe two different types of membership. It should also be understood that the term "total membership" includes both owners and team members. Thus, a team with one owner and one team member has a total membership of two.

FIG. 1 indicates that Team "Product Development" has two team goals: "Produce software that meets all specs" and "Complete software on time." The members of Team "Product Development" would be expected to help with at least one of those team goals. In the example embodiment, goal management system 10 uses specific rules to control how goals are connected with teams and otherwise managed and what types of goals are supported. Those rules will now be described with reference to FIGS. 2 and 3.

Figure 2:
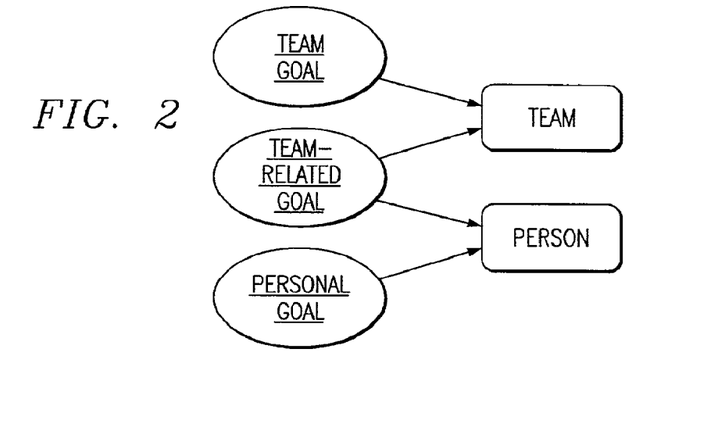
FIG. 2 is a block diagram depicting relationships between goals, teams, and people according to an example goal management system.

As indicated in FIG. 2, goal management system 10 supports three types of goals: team goals, team-related goals, and personal goals. Team goals are goals that the owner (e.g., the team leader) creates for the team. Team-related goals are goals that members of the team set for themselves in support of a team goal. Personal goals are goals that a person creates for himself or herself, without any connection to any particular team goal. Thus, as illustrated by the arrows in FIG. 2 relating each goal to a team and/or a person, each team goal is linked to a team, and each team-related goal is linked both to a team and a person, while each personal goal is only linked to a person.

More specifically, in the example embodiment, goal management system 10 imposes the following rules regarding goals:
1. every goal is either a team goal, a team-related goal, or a personal goal;
2. every goal has an owner;
3. each team goal is linked to one team and is created and managed by the owner of that team;
4. each team goal except for team goals of the top team (i.e., each child goal) has a parent goal, and that parent goal is linked to the parent team of the team that is linked to the child goal;
5. each team goal except for team goals of the top team (i.e., each child goal) has an owner, and that owner is one of the other members of the parent team of the team that is linked to that child goal;
6. each team-related goal is linked to one team goal;
7. each team-related goal is owned by one of the other members of the team associated with the team goal to which the team-related goal is linked; and
8. personal goals are not linked to any other goals.

In addition, the owner of a goal is preferably the person who creates and manages that goal.

Figure 3:
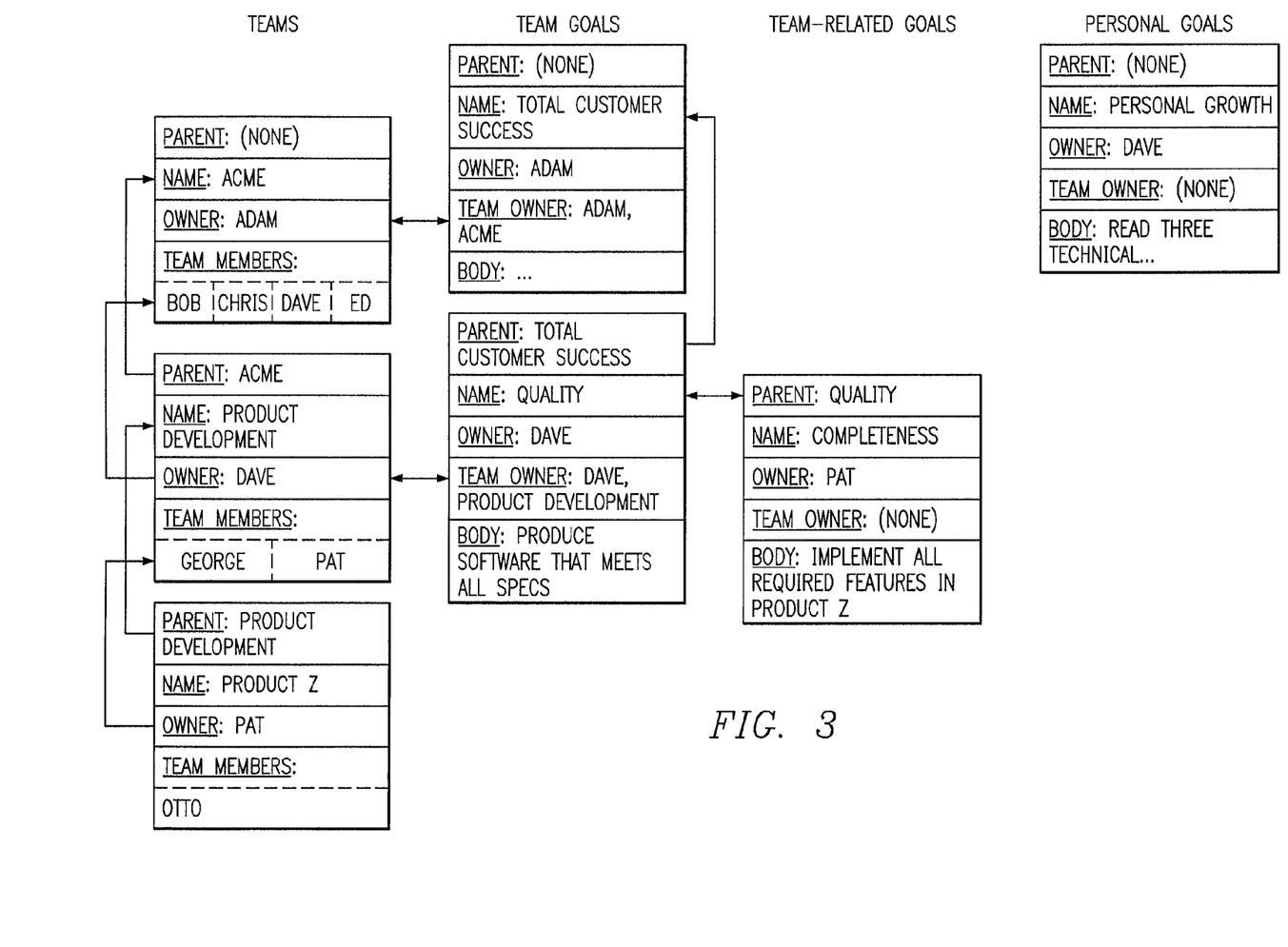
FIG. 3 is a block diagram depicting relationships between and among teams and various types of goals according to the example goal management system.

FIG. 3 illustrates how team goals are related to teams and other goals. For example, FIG. 3 depicts a team goal named "Quality" in the TEAM GOALS column. In accordance with rule 3, "Quality" is linked to one team, Team "Product Development," via the Team Owner field. In accordance with rule 4, "Quality" has a parent goal of "Total Customer Success," and "Total Customer Success" is linked to the parent of Team "Product Development," "Team "Acme." Also, as per rule 5, the owner of "Quality" is one of the other members of the parent team of Team "Product Development." That is, Dave is one of the other members of Team "Acme".

In addition, FIG. 3 illustrates how team-related goals are related to teams and other goals. For example, FIG. 3 depicts a team-related goal "Completeness" in the TEAM-RELATED GOALS column. In accordance with rule 6, "Completeness" is linked to one team goal (i.e., "Quality). Also, in accordance with rule 7, the owner of "Completeness" (i.e., Pat) is one of the other members of the team associated with team goal "Quality." That is, Pat is one of the other members of Team "Product Development."

In the example embodiment, goal management system 10 enforces the rules through use of wizards which are automatically activated when users select functions for adding and editing goals and teams. As described in greater detail below, the wizards provide instructions that correspond to the rules, as well as graphical objects, such drop-down lists and lists with radio buttons, that allow goals and teams to be created and modified in accordance with the rules.

In addition, goal management system 10 allows each person in the organization to view all goals of all teams to which the person belongs, as well as all goals that are parents to those goals, including indirect parents, such as grandparents, great grandparents, etc. By providing global goal visibility for relevant goals and enforcing the above rules when people from the organization manage teams and goals, for example by creating, modifying, and/or deleting teams and goals, goal management system 10 helps to ensure that the goals of all teams are aligned.

Furthermore, goal management system 10 includes various facilities for automatically soliciting evaluations for goals, while enforcing rules regarding those evaluations. Among those rules is the rule that each goal for each person (other than the person at the top of the reporting chain) is to be approved by that person's direct supervisor, without regard to whether the direct supervisor is the owner of the parent goal for the goal being approved. For example, with reference to FIG. 3, Dave owns the goal "Quality," and Adam owns the goal "Total Customer Success," the parent goal to the goal "Quality." Nevertheless Dave obtains approval for the goal "Quality" not from Adam, but from Chris, since Chris is Dave's supervisor, according to the reporting chain, as indicated in FIG. 1. Those of ordinary skill in the art will recognize that the foregoing is one of many rules that can be implemented to enforce an organization's own approval policies.

Referring again to FIG. 4, there is depicted a block diagram of goal management system 10 according to the example embodiment. The example embodiment implements goal management technologies or tools as control logic and/or data constructs that encode business rules which facilitate, and enforce use of, particular goal-management practices.

Specifically, goal management system 10 includes data control logic 12 and user-interface control logic 14. As explained in greater detail below, data control logic 12 includes computer instructions that enforce the rules described herein, and user-interface control logic 14 includes computer instructions for presenting information to users. For instance, those computer instructions may be programs written in the JAVA language and/or scripts written using Java Server Pages (JSP). Goal management system 10 also includes a database 16 for storing team and goal data on appropriate data storage. That data may be stored, for instance, in a relational database, such as a structured query language (SQL) database.

In the illustrated embodiment, database 16, user-interface control logic 14, and data control logic 12 all reside within a single data processing system 18. For example, goal management system 10 may operate within a client-server network 17, and data processing system 18 may be a server within network 17. Data processing system 18 may include data storage, such as read only memory (ROM), random access memory (RAM), one or more hard disk drives, etc., and one or more central processing units (CPUs). The data storage devices may also be referred to as computer-usable media. Additional computer-usable media include, without limitation, transmission media such as wires, radio waves, microwaves, and other electromagnetic and/or optical carriers. Visual output may be presented primarily on displays of client data processing systems 19 within network 17, under the control of user-interface control logic 14. The different components for data storage, instruction processing, output presentation, etc., are known generally as processing resources.

However, as will be readily apparent to those of ordinary skill in the art, numerous changes to the illustrated arrangement could easily by utilized in alternative embodiments of the invention. For example, multiple databases could be utilized, and one or more of those databases could reside on one or more machines separate from the machine hosting the data control logic. Similarly, the data control logic and/or the user/interface control logic could run on different hardware, such as within network clients. Likewise, different types of networks, different types of hardware, and different programming languages could be used to implement alternative embodiments of the goal management system of the present invention. Alternatively, all operations, including the display of information, could be performed in a single data processing system. For purposes of illustration, however, this detailed description focuses on the embodiment shown in FIG. 4.

Figure 5:
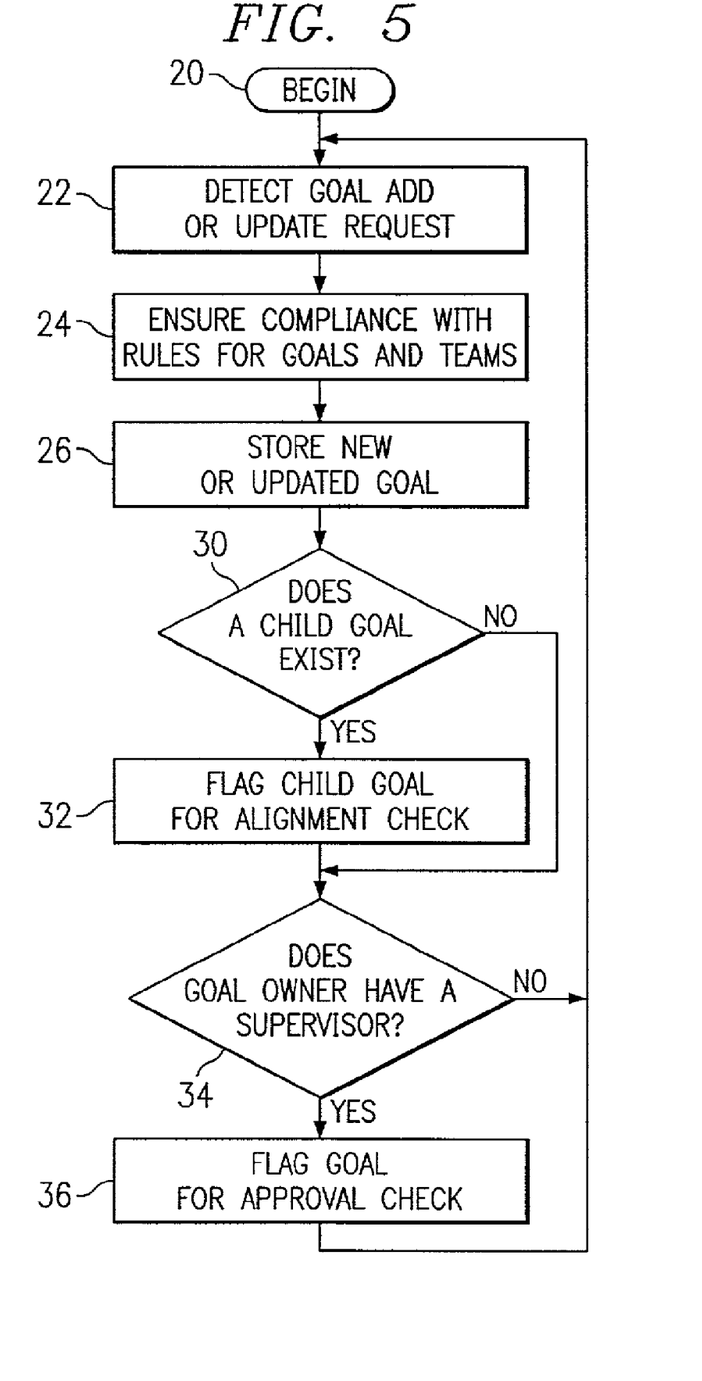
FIG. 5 is a flow chart depicting a process for managing goals according to the example goal management system.

Referring now also to FIG. 5, there is depicted a flowchart of an illustrative process for managing goals according to an embodiment of the invention. The illustrated process begins at block 20 with goal management system 10 running on data processing system 18. Block 22 then depicts the detection by data control logic 12 of a user request to add or update a goal in goal management system 10. In response, data control logic 12 ensures that the request complies with the rules for goals described above, as indicated at block 24.

For example, if data control logic 12 detects a request to add a goal, a wizard is activated to have the user specify whether the goal is a personal goal, a team goal, or a team-related goal. For team goals and team-related goals, the wizard then prompts the user to select a team to be associated with the new goal from a drop-down list of teams, and to select a parent goal for the new goal from a list showing all team goals linked to the selected team. The same or similar tools are provided for use in changing the characteristics of existing goals.

In the example embodiment, the wizard facilitates goal alignment for the team goals and the team-related goals. One of the ways the wizard facilitates goal alignment for both of those types of goals is by dynamically determining content for the wizard screens based on the rules for relationships between goals and the rules for relationships between goals and teams. Specifically, the wizard determines the content in accordance with rules such as the rules for relationships between goals of the same type and the rules for relationships between team goals and team-related goals. By dynamically customizing the screens with which the user interacts, the wizard discourages or prevents the user from saving goals with relationships that violate the rules.

Figure 8:
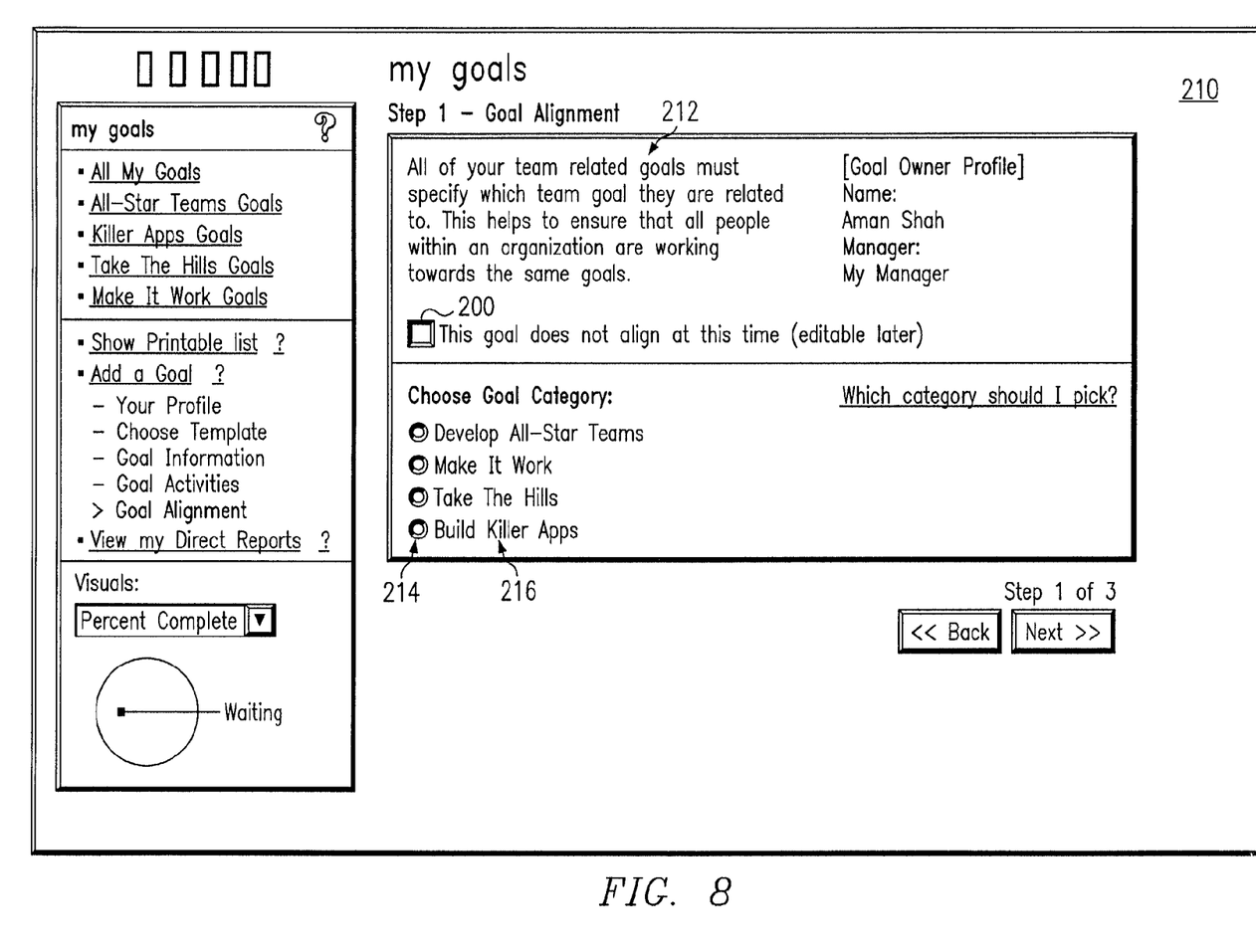

FIGS. 8 and 9 present example user interfaces generated by the wizard to facilitate goal alignment. The window illustrated in FIG. 8 is the first window or screen 210 displayed when a user modifies an existing goal by modifying the alignment flag 200 to indicate that the goal is to be aligned. Screen 210 is also displayed when a user adds a goal. In particular, the illustrated screen 210 relates to the process of modifying a team-related goal, and the wizard therefore automatically inserts instructions 212 describing the required relationships for team-related goals. If it were a team goal being modified, the wizard instead would have inserted instructions describing the required relationships for team-related goals.

Screen 210 also includes a set of radio buttons 214 associated with a predefined set of high-level goals for the organization. In the example embodiment, the high-level goals in the predefined set are team goals defined by the organization as belonging at the top level. Labels 216 indicate the top level goal associated with each radio button 214.

Referring to FIG. 9, after the user has selected the desired radio button, the wizard presents a second screen 220 which includes a drop-down box 222 for selecting the team to be linked with the goal currently being modified (i.e., the current goal). The wizard automatically customizes drop-down box 222 to list only the teams which include the user. When the user selects the desired team, the wizard cross references the selected team with the selected top-level goal to determine which team goals are both aligned with the selected top-level goal and linked to the selected team. If no such goals are found, the wizard automatically flags the current goal as not aligned in flag 200 and presents an appropriate message 224 in screen 220. Otherwise, the goals resulting from the cross reference are listed for selection as the parent goal of the current goal.

Referring again to FIG. 5, upon successful completion of the add or edit operation, data control logic 12 stores the new or updated goal in database 16, as depicted at block 26. The add or update operation then triggers an automatic determination of whether a child goal exists for the added or edited goal, as indicated at block 30. If a child goal does exist, goal management system 10 automatically flags or highlights the child goal so that a user interface for the owner of that child goal indicates that the alignment of the child goal should be verified, as depicted at block 32. Goal management system 10 thus prompts owners of goals to check alignment whenever a goal's parent goal has changed. If the owner is currently viewing the goal, user-interface control logic 14 highlights the goal in real time. Otherwise, user-interface control logic 14 highlights the goal the next time the owner displays the goal.

Once the goal is flagged or highlighted, or if it is determined that no child goal exists, data control logic 12 then determines whether the owner of the new or edited goal has a supervisor, as depicted at block 34. If so, goal management system 10 automatically flags or highlights the goal in a user interface for the supervisor to indicate that the goal is waiting for approval, as shown at block 36. Goal management system 10 thus prompts supervisors to approve or re-approve goals of reporting individuals after the reporting individuals add or change goals. As above, user-interface control logic 14 highlights the goal immediately or upon the next viewing of the goal, depending on whether or not the goal is currently begin displayed for the supervisor.

Once the goal has been flagged or highlighted for approval, or if it is determined that the goal owner has no supervisor, the process returns to block 22 to process any additional add or change requests.

Goal management system 10 includes numerous additional features that help ensure that the goals are aligned, including graphical user interfaces with objects that provide alignment information and warnings and connections to tools for checking alignment. For example, with reference to FIG. 6, an exemplary goal management screen 40 is illustrated. As shown, for each displayed goal, goal management screen 40 includes a manager warning 42, a feedback warning 44, and an alignment warning 46. Goal management system 10 highlights the warnings, for example by coloring the warnings red or amber, to notify a person managing his or her goals that certain actions are advisable.

Figure 6:
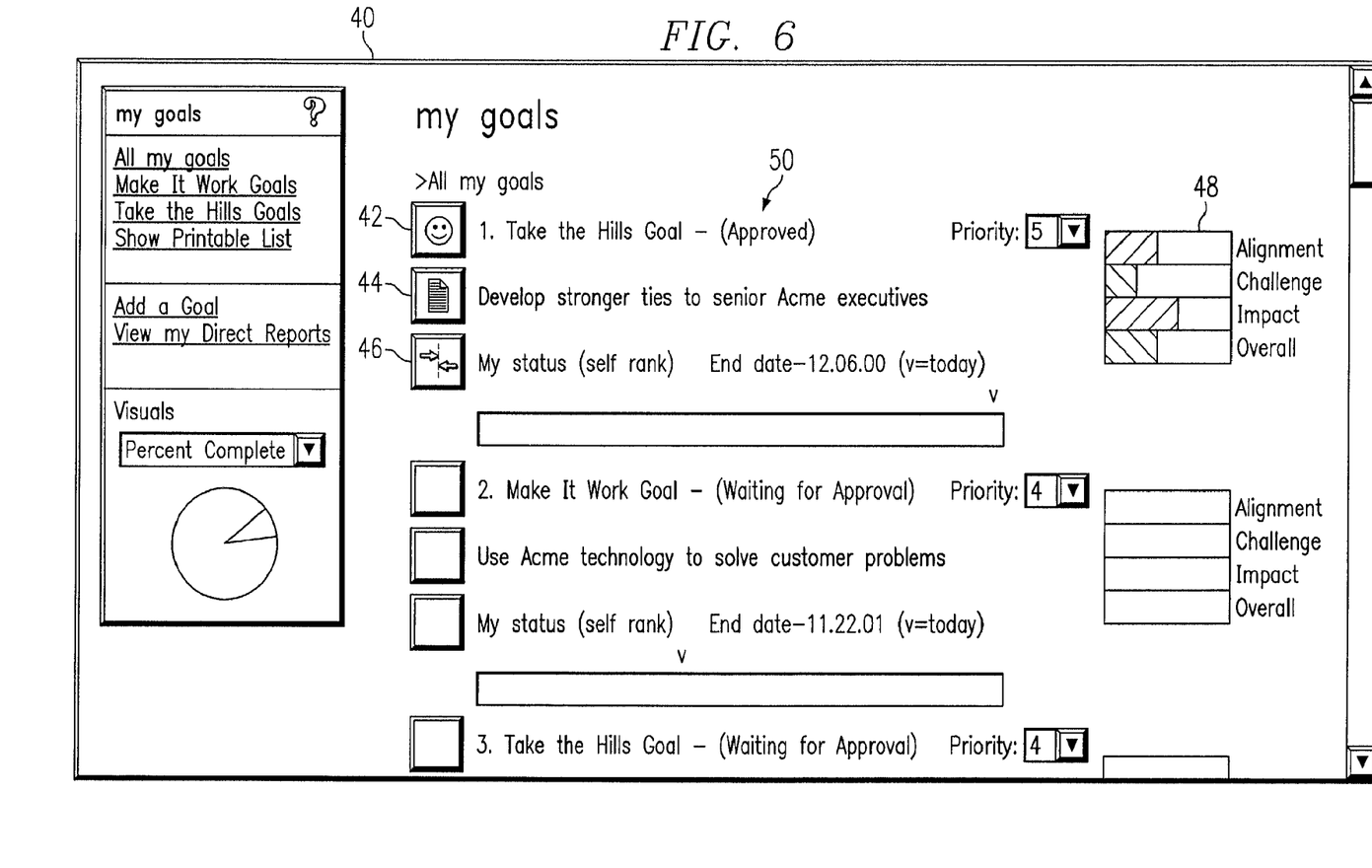
FIG. 6 depicts an exemplary user interface for displaying and managing goals according to the example goal management system.

In the illustrated embodiment, for example, for each displayed goal, user-interface control logic 14 automatically highlights alignment warning 46 in response to goal management system 10 detecting that a parent goal of the displayed goal has been modified or deleted. Selecting alignment warning 46, such as by clicking alignment warning 46 with a pointing device, causes goal management system 10 to open an interface for viewing the modified parent goal. Alignment warning 46 thus serves as a link to the interface for viewing the parent goal.

Similarly, user-interface control logic 14 automatically highlights manager warning 42 to indicate that the viewer's supervisor has provided feedback pertaining to the corresponding goal. Selecting manager warning 42 causes goal management system 10 to open an interface for viewing the comments and for providing a private line of communication between the viewer and the supervisor. Manager warning 42 thus serves as a link to that interface. Likewise, user-interface control logic 14 may automatically highlight feedback warning 42 to indicate that one or more people other than the viewer's supervisor have provided feedback pertaining to the corresponding goal, with feedback warning 42 serving as a link to an interface for viewing that feedback.

Goal management screen 40 also includes evaluation status objects 50 that show which goals have been evaluated by a supervisor and, for goals that have been evaluated, whether or not the supervisor has given the goal approval.

In addition, goal management screen 40 includes a number of evaluation summary objects, including an alignment indicator 48. The evaluation summary objects are graphical objects that advise the viewer as to the importance and effectiveness of each displayed goal. Goal management system 10 allows the goal owner and the supervisor of the goal owner to evaluate each aspect of each goal. For team goals and team-related goals, goal management system 10 also accepts evaluations from each member of the team that is linked to the goal. The evaluation summary objects, such as alignment indicator 48, depict an aggregate of all entered evaluations for the aspect corresponding to that object. For instance, if a goal owner assigns a value of ten out of ten for a goal's alignment, but other people assign a value of one out of ten for alignment, alignment indicator 48 would show a low level of alignment, for example by filling only a small portion of alignment indicator 48 with color.

Figure 7:
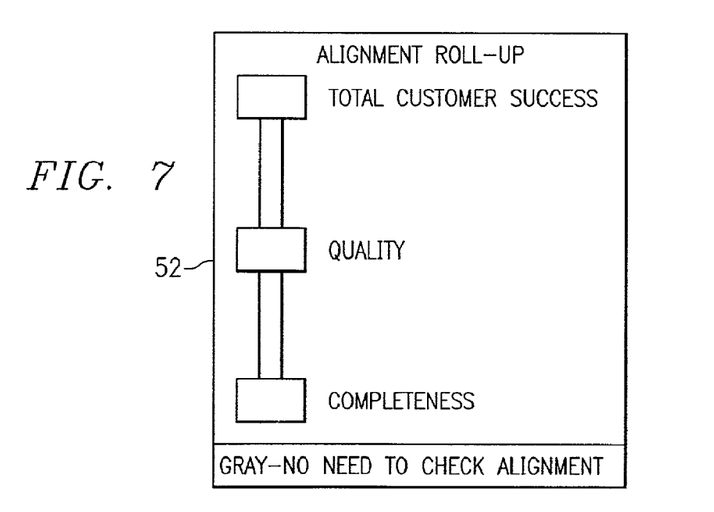
FIG. 7 depicts an example user interface for summarizing goal alignment status according to the example goal management system.

Goal management system 10 also provides an interface that indicates at a glance the relative positions of particular goals and whether any particular goal should be checked for alignment. For example, with reference to FIG. 7, goal management system 10 provides an alignment roll-up window 52 that shows the chain of goals from a given goal to the top goal. Alignment roll-up window 52 also indicates whether alignment should be checked between any goal and its parent goal. For example, if alignment between a goal and its parent should be checked, goal management system 10 shows the link between the goal and its parent in amber or red, rather than a default color such as gray.

Goal management system 10 also provides a member alignment interface for owners of team goals to use to study the goals that have been linked to those team goals. For example, the member alignment interface lists each team owned by the person using the interface (i.e., owned by the viewer) and each team goal that is linked to one of those teams. In addition, the member alignment interface lists each goal that is linked to any of those team goals, with the linked goals in that list grouped according to ownership. The member alignment interface includes graphical objects such as manager warning 42, feedback warning 44, alignment warning 46, alignment indicator 48, and evaluation status object 50 to show the current state of a selected goal in the list of goals.

The same or a similar interface is used by supervisors to view the goals of their direct reports. Furthermore, as described above, goal management system 10 automatically notifies the supervisor whenever a direct report enters or modifies a goal, to request approval for the new or modified goal from the supervisor. That notification may be provided, for example, by highlighting the goals in the list that are awaiting approval. Thus, in addition to automatically prompting goal owners to check alignment in response to upstream changes, goal management system 10 also automatically prompts supervisors to check goals of direct report's in response to downstream changes.

Conclusion

As has been described, the example goal management system provides convenient and effective tools for maintaining goal alignment in a dynamic environment. Those tools organize all of the goals within the organization into a common structure, which helps to ensure that different members of the organization will not adopt goals with cross purposes and that all of the goals contribute to the overall purpose or goals of the organization. In addition, by providing this structure and providing for increased visibility of goals, the illustrated goal management system allows everyone to see how the organization as a whole is progressing in establishing and maintaining the hierarchy of goals and how individual and team contributions fit in with the larger goals of the organization.

The structure provided by the illustrated goal management system also facilitates effective analysis of the stored data. One job of a manager is to ensure that his or her direct reports and the teams that he or she manages are working on the right things. By codifying an organization's team and goal information in a real-time, flexible, consistent system and providing automated tools which analyze this information, the manager's responsibility to maintain goal alignment is made significantly easier.

Although an illustrative embodiment of the present invention has been described in detail, it should be understood that various changes, substitutions and alterations can be made to the illustrative embodiment without departing from the spirit and scope of the invention. For example, although FIG. 1 might be interpreted as suggesting that data constructs such as identifiers or pointers within records or rows are utilized to encode and store relationships such as parent links in the goal management system, those of ordinary skill in the art will appreciate that the actual mechanisms utilized to encode such relationships may easily be varied to suit the operating environment for a particular goal management system. The implementation specifics for any particular embodiment should be chosen based on considerations such as the operating environment (including hardware and software) and cost and performance objectives. The scope of the invention is therefore not limited to the particulars of the illustrative embodiment but is defined by the appended claims.

What is claimed is:

1. A guidance process of maintaining goals in a system with at least first and second goal types so as to promote goal alignment, the guidance process method comprising:
performing using a computer system:
requesting verification of alignment between a goal of a first type and a goal of a second type;
indicating alignment of the goal of the first type and the goal of the second type at least upon receiving a response to the requested verification of alignment;
determining, with the computer system, that the goal of the first type has been modified; and
when a goal of the first type is modified, executing goal alignment code to:
(i) check for alignment between the goal of the first type and the goal of the second type in accordance with at least a rule for relationships between goals of the first goal type and goals of the second goal type; and
(ii) generate an alignment warning with the computer system to alert a viewer of the display of the alignment warning and provide notice regarding alignment between the modified primary goal and the secondary goal.

2. The method of claim 1 further comprising:
dynamically determining content for a user interface such that the content directs a user of a user interface in generation of content of a goal of the second type that causes alignment of the goal of the second type with the goal of the first type.

3. The method of claim 2 further comprising:
dynamically determining content for the user interface comprises automatically customizing content for a screen capable of being displayed by a wizard, in accordance with at least the first rule and directing the user of the user interface in the generation of the content of the goal of the second type that results in alignment of the goal of the second type with the goal of the first type.

4. The method of claim 3 further comprising:
providing data to activate the wizard in response to a request from a user to modify the goal of the second type;
providing data to prompt the user to select a team to be associated with the goal of the second type from a drop-down list of teams; and
providing data to prompt the user to select a parent goal for the goal of the second type from a list showing all team goals linked to the selected team wherein the parent goal selected by the user becomes the goal of the first type.

5. The method of claim 4 further comprising:
in response to modification of the goal of the second type, automatically determining whether a child goal exists for the goal of the second type; and
in response to determining that the child goal does exist, automatically flagging the child goal to cause a user interface for an owner of that child goal to indicate that the child goal should be checked for alignment.

6. The method of claim 5 further comprising:
determining that the owner has verified the alignment of the child goal; and
in response to determining that the owner has verified the alignment, automatically unflagging the child goal.

7. The method of claim 6 wherein determining content for the user interface comprises automatically flagging the goal of the second type for supervisory approval in response to determining that the user has a supervisor.

8. The method of claim 7 wherein determining content for the user interface comprises:
populating objects for a graphical user interface with alignment information and warnings; and
providing connections to tools for checking alignment.

9. The method of claim 8 wherein populating objects for a graphical user interface with alignment information and warnings comprises specifying an appearance for at least one of a manager warning object, a feedback warning object, and an alignment warning object.

10. The method of claim 9 wherein specifying an appearance for at least one of a manager warning object, a feedback warning object, and an alignment warning object comprises highlighting the alignment warning object in response to determining that the parent goal has been modified.

11. The method of claim 9 wherein specifying an appearance for at least one of a manager warning object, a feedback warning object, and an alignment warning object comprises highlighting the manager warning object in response to determining that a supervisor has provided feedback pertaining to the goal of the second type.

12. The method of claim 8 wherein:
providing connections to tools for checking alignment comprises providing an alignment warning object; and
the method further comprises displaying an interface for viewing the parent goal, in response to selection of the alignment warning object.

13. The method of claim 8 wherein dynamically determining content for the user interface further comprises providing an evaluation status object that indicates whether a supervisor has evaluated the goal of the second type.

14. The method of claim 13 wherein dynamically determining content for the user interface further comprises providing an evaluation summary object that reflects evaluation results relating to at least one of importance and effectiveness of the goal of the second type.

15. A computer system comprising:
a processor;
a memory, coupled to the processor, having code stored therein and executable by the processor to:
request verification of alignment between a goal of a first type and a goal of a second type;

indicate alignment of the goal of the first type and the goal of the second type at least upon receiving a response to the requested verification of alignment;

determine that the goal of the first type has been modified; and when a goal of the first type is modified:
- (i) check for alignment between the goal of the first type and the goal of the second type in accordance with at least a rule for relationships between goals of the first goal type and goals of the second goal type; and
- (ii) generate an alignment warning with the computer system to alert a viewer of the display of the alignment warning and provide notice regarding alignment between the modified primary goal and the secondary goal.

16. The computer system of claim 15 wherein the code is further executable by the processor to:

dynamically determine content for a user interface such that the content directs a user of a user interface in generation of content of a goal of the second type that causes alignment of the goal of the second type with the goal of the first type.

17. The computer system of claim 16 wherein the code is further executable by the processor to:

dynamically determine content for the user interface comprises automatically customizing content for a screen capable of being displayed by a wizard, in accordance with at least the first rule and directing the user of the user interface in the generation of the content of the goal of the second type that results in alignment of the goal of the second type with the goal of the first type.

18. The computer system of claim 17 wherein the code is further executable by the processor to:

activate the wizard in response to a request from a user to modify the goal of the second type;

prompt the user to select a team to be associated with the goal of the second type from a drop-down list of teams; and prompt the user to select a parent goal for the goal of the second type from a list showing all team goals linked to the selected team wherein the parent goal selected by the user becomes the goal of the first type.

19. The computer system of claim 18 wherein the code is further executable by the processor to:

in response to modification of the goal of the second type, automatically determine whether a child goal exists for the goal of the second type; and in response to a determination that the child goal does exist, automatically flag the child goal to cause a user interface for an owner of that child goal to indicate that the child goal should be checked for alignment.

20. The computer system of claim 19 wherein the code is further executable by the processor to:

determine that the owner has verified the alignment of the child goal; and in response to determining that the owner has verified the alignment, automatically unflag the child goal.

21. The computer system of claim 20 wherein to determine content for the user interface comprises to automatically flag the goal of the second type for supervisory approval in response to determining that the user has a supervisor.

22. The computer system of claim 21 wherein to determine content for the user interface comprises:

to populate objects for a graphical user interface with alignment information and warnings; and to provide connections to tools for checking alignment.

23. The computer system of claim 22 wherein to populate objects for a graphical user interface with alignment information and warnings comprises to specify an appearance for at least one of a manager warning object, a feedback warning object, and an alignment warning object.

24. The computer system of claim 23 wherein to specify an appearance for at least one of a manager warning object, a feedback warning object, and an alignment warning object comprises a highlighting the alignment warning object in response to determining that the parent goal has been modified.

25. The computer system of claim 21 wherein to specify an appearance for at least one of a manager warning object, a feedback warning object, and an alignment warning object comprises highlighting the manager warning object in response to determining that a supervisor has provided feedback pertaining to the goal of the second type.

26. The computer system of claim 22 wherein:

to provide connections to tools for checking alignment comprises providing an alignment warning object; and the code is further executable by the processor to generate data to display an interface for viewing the parent goal, in response to selection of the alignment warning object.

27. The computer system of claim 22 wherein to dynamically determine content for the user interface further comprises to provide an evaluation status object that indicates whether a supervisor has evaluated the goal of the second type.

28. The computer system of claim 27 wherein to dynamically determine content for the user interface further comprises to provide an evaluation summary object that reflects evaluation results relating to at least one of importance and effectiveness of the goal of the second type.

29. A tangible, non-transitory computer readable medium comprising code stored therein and executable by a processor to:

request verification of alignment between a goal of a first type and a goal of a second type;

indicate alignment of the goal of the first type and the goal of the second type at least upon receiving a response to the requested verification of alignment;

determine that the goal of the first type has been modified; and when a goal of the first type is modified:
- (i) check for alignment between the goal of the first type and the goal of the second type in accordance with at least a rule for relationships between goals of the first goal type and goals of the second goal type; and
- (ii) generate an alignment warning with the computer system to alert a viewer of the display of the alignment warning and provide notice regarding alignment between the modified primary goal and the secondary goal.

30. The computer readable medium of claim 15 wherein the code is further executable by the processor to:

dynamically determine content for a user interface such that the content directs a user of a user interface in generation of content of a goal of the second type that causes alignment of the goal of the second type with the goal of the first type.

31. The computer readable medium of claim 16 wherein the code is further executable by the processor to:

dynamically determine content for the user interface comprises automatically customizing content for a screen capable of being displayed by a wizard, in accordance with at least the first rule and directing the user of the user interface in the generation of the content of the goal of the second type that results in alignment of the goal of the second type with the goal of the first type.

32. The computer readable medium of claim 17 wherein the code is further executable by the processor to:
- activate the wizard in response to a request from a user to modify the goal of the second type;
- prompt the user to select a team to be associated with the goal of the second type from a drop-down list of teams; and
- prompt the user to select a parent goal for the goal of the second type from a list showing all team goals linked to the selected team wherein the parent goal selected by the user becomes the goal of the first type.

33. The computer readable medium of claim 18 wherein the code is further executable by the processor to:
- in response to modification of the goal of the second type, automatically determine whether a child goal exists for the goal of the second type; and
- in response to a determination that the child goal does exist, automatically flag the child goal to cause a user interface for an owner of that child goal to indicate that the child goal should be checked for alignment.

34. The computer readable medium of claim 19 wherein the code is further executable by the processor to:
- determine that the owner has verified the alignment of the child goal; and
- in response to determining that the owner has verified the alignment, automatically unflag the child goal.

35. The computer readable medium of claim 20 wherein to determine content for the user interface comprises to automatically flag the goal of the second type for supervisory approval in response to determining that the user has a supervisor.

36. The computer readable medium of claim 21 wherein to determine content for the user interface comprises:
- to populate objects for a graphical user interface with alignment information and warnings; and
- to provide connections to tools for checking alignment.

37. The computer readable medium of claim 22 wherein to populate objects for a graphical user interface with alignment information and warnings comprises to specify an appearance for at least one of a manager warning object, a feedback warning object, and an alignment warning object.

38. The computer readable medium of claim 23 wherein to specify an appearance for at least one of a manager warning object, a feedback warning object, and an alignment warning object comprises a highlighting the alignment warning object in response to determining that the parent goal has been modified.

39. The computer readable medium of claim 21 wherein to specify an appearance for at least one of a manager warning object, a feedback warning object, and an alignment warning object comprises highlighting the manager warning object in response to determining that a supervisor has provided feedback pertaining to the goal of the second type.

40. The computer readable medium of claim 22 wherein:
- to provide connections to tools for checking alignment comprises providing an alignment warning object; and
- the code is further executable by the processor to generate data to display an interface for viewing the parent goal, in response to selection of the alignment warning object.

41. The computer readable medium of claim 22 wherein to dynamically determine content for the user interface further comprises to provide an evaluation status object that indicates whether a supervisor has evaluated the goal of the second type.

42. The computer readable medium of claim 27 wherein to dynamically determine content for the user interface further comprises to provide an evaluation summary object that reflects evaluation results relating to at least one of importance and effectiveness of the goal of the second type.

* * * * *